United States Patent Office 3,251,788
Patented May 17, 1966

3,251,788
PREPARATION OF POLYURETHANE FOAM FROM 1-{2[BIS(2-HYDROXYPROPYL)AMINO]ETHYL}-4-(2-HYDROXYPROPYL)PIPERAZINE
Vernon A. Currier and Michael Cuscurida, Austin, Tex., assignors to Jefferson Chemical Company, Inc., Houston, Tex., a corporation of Delaware
No Drawing. Original application July 16, 1962, Ser. No. 210,222. Divided and this application Feb. 26, 1965, Ser. No. 435,704
4 Claims. (Cl. 260—2.5)

This application is a division of copending Currier et al. application Serial No. 210,222, filed July 16, 1962, and entitled, "New Compound and Method for Preparing Polyurethane Therefrom."

This invention relates to a new polyfunctional compound, a method for preparing the compound, a foamed polyurethane made therefrom and a method for preparing the polyurethane therefrom.

It is known to prepare rigid polyurethane foams by reacting a polyfunctional polyol with an organic polyisocyanate in the presence of a blowing agent and a catalytically effective amount of a low molecular weight acyclic or heterocyclic aliphatic tertiary amine. However, the use of amine catalysts of this nature has not been entirely satisfactory because of the objectionable odor that is frequently imparted and because of their cost.

It has now been discovered that the foregoing and related problems can be significantly overcome through the provision of a new asymmetrical polyfunctional compound containing not only secondary hydroxyl groups but also tertiary nitrogen groups; such compound having good reactivity with rigid polyurethane feed materials to thereby provide rigid polyurethane foams.

The new compound is 1-{2[bis(2-hydroxypropyl)-amino]ethyl}-4-(2-hydroxypropyl)piperazine. The compound is easily prepared by bringing propylene oxide into contact with N-aminoethylpiperazine at a temperature in excess of about 50° C. The reaction proceeds non-catalytically and terminates after the reaction of three mols of propylene oxide with each mol of N-aminoethylpiperazine to quantitatively provide the new compound of the present invention (hereinafter referred to as propoxylated N-aminoethylpiperazine).

It has also been discovered that rigid polyurethane foams can be prepared by reacting an organic polyisocyanate in the presence of a blowing agent and a foam stabilizer with an equivalent amount of a hydroxyl component consisting essentially of from about 30 to 90 wt. percent of the propoxylated N-aminoethylpiperazine of the present invention and, correspondingly, from about 70 to about 10 wt. percent of a polyol having an average of at least three terminal hydroxy groups and having a hydroxyl number within the range of about 250 to about 750, said polyol being selected from the group consisting of polyhydric alcohols and linear polyesters having terminal hydroxy groups, which polyesters are obtained from reaction of a polycarboxylic acid with a polyhydric alcohol. The polyhydric alcohol may be a polyether obtained, for example, by the ethoxylation or propoxylation of a trihydric, tetrahydric, etc., aliphatic alcohol.

The results obtained in the preparation of rigid polyurethane foams in accordance with the method of the present invention are truly surprising. Thus, for example, unsatisfactory results are obtained with closely related compounds. For example, the compound trimethylaminoethylpiperazine is not a highly effective urethane catalyst. Propylene oxide condensates of aliphatic amines such as the tetrapropylene oxide condensate of ethylenediamine have insufficient activity on a weight basis to give equivalent results with equivalent formulations. This is likewise true if the propoxylated N-aminoethylpiperazine is compared with the four mol propylene oxide condensate of ethylenediamine on a mol basis.

As has been indicated, the novel compound of the present invention is a three mol propylene oxide adduct of aminoethylpiperazine having the systematic name 1-{2-[bis(2 - hydroxypropyl)amino]ethyl} - 4 - (2 - hydroxypropyl)piperazine and having the formula:

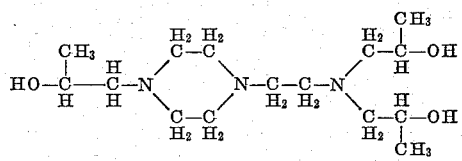

As will be observed from the above formula, the new compound of the present invention is asymmetrical and contains a heterocyclic ring structure. It is also to be observed that the compound contains three tertiary nitrogen atoms; that one of the nitrogen atoms is substituted with two beta-hydroxypropyl groups; that another nitrogen atom is substituted with a single beta-hydroxypropyl group and that the third nitrogen atom is free from substituent beta-hydroxypropyl groups.

The new compound with the present invention is easily prepared by the non-catalytic reaction of three mols of propylene oxide with one mol of N-aminoethylpiperazine. The reaction is preferably conducted at a temperature above 50° C. Although stoichiometric amounts of propylene oxide and N-aminoethylpiperazine may be used, it is normally preferable to utilize an excess of propylene oxide since the non-catalytic reaction is self terminating after the reaction of three mols of propylene oxide with each mol of N-aminoethylpiperazine. That is, after the amine active hydrogen atoms have reacted with propylene oxide, no additional propoxylation occurs at the hydroxyl groups.

When the compound of the present invention is to be utilized in the preparation of rigid polyurethane foams, the other ingredients for the foam formation steps include a polyisocyanate, a polyol, a blowing agent and a foam stabilizer.

The preferred class of polyisocyanates to be utilized are the organic polyisocyanates, such as toluene diisocyanate, 2,4-diisocyanate, cyclohexylene diisocyanate, phenylene diisocyanate, diphenylmethane diisocyanate, 3,3'-dimethyl-4,4'-biphenylene diisocyanate, tetramethylene diisocyanate, hexamethylene diisocyanate, m-xylylene-1,3-diisocyanate, 2,6-diethylbenzene-1,4-diisocyanate, 3,3'-dimethoxydiphenyl-methane-4,4' - diisocyanate, etc., and mixtures thereof.

The polyol to be utilized should preferably be a polyol containing at least three terminal hydroxy groups. Moreover, the polyol should suitably have a hydroxyl number within the range of about 250 to about 750.

One class of polyols that may be utilized are polyethers prepared by the propoxylation of a triol, such as glycerine, hexanetriol, etc.; a tetrol, such as pentaerythritol, alpha-methyl-D-glucoside; a pentol, such as arabitol, xylitol, adonitol and anhydroenneaheptitol; or a hexol, such as sorbitol and mannitol.

Another class of polyols that may be utilized successfully are the hydroxy terminated polyesters prepared by reacting a polyhydric alcohol with a polycarboxylic acid and having a molecular weight within the range of about 400 to about 4000. Typical polyesters of this nature include polyethylene adipate, polypropylene succinate, poly-1,2-propylene adipate, polyethylene succinate, polyethylene sebacate, polyethylene azelate, diethylene glycol-dimerized linoleic acid, polypropylene glycol-dimerized linoleic acid, and mixtures thereof. Also included would be polyfunctional glycerine or trimethylolpropane-diethylene glycol or propylene glycol condensation products. These esters are conveniently prepared by reacting the glycol and acid components at a temperature within the range of about 120° to about 210° C. to remove water partially and to provide a polyester having active hydroxyl hydrogens at the end of the polyester chain.

As has been indicated, the propoxylated N-aminoethyl piperazine of the present invention should comprise from about 30 to about 90 wt. percent of the hydroxyl components of the polyurethane manufacture, and the polyol should constitute the remaining 70 to 10 wt. percent.

The blowing agent to be used may be any suitable blowing agent of the type known to those skilled in the art. Thus, normally liquid halogenated aliphatic hydrocarbons, monochlorotrifluoromethane, dichlorodifluoromethane, etc., may be utilized as desired.

Similarly, the foam stabilizer may be any of the foam stabilizers known to those skilled in the art, including silicone glycol copolymers, dimethyl polysiloxane, polyethoxylated vegetable oils, polyethoxylated fatty acids, polyethoxylated phenols, polyethoxylated sorbitan monoesters and sorbitan monoesters.

The polyisocyanate and polyols should be proportioned so as to provide for substantially equivalent amounts of the two ingredients. Preferably, however, a slight excess of polyisocyanate is employed. The blowing agent should be used in amounts sufficient to provide for a foam of a desired density. For example, with respect to halogenated aliphatic hydrocarbons such as chlorofluoromethanes, the blowing agent may comprise from about 5 to about 15 wt. percent of the combined weight of polyol and polyisocyanate.

The foam stabilizer, which is preferably but not necessarily employed, should be used in a stabilizing amount (e.g., from about 0.01 to about 5 wt. percent, based on the total weight of charged materials).

The reaction between the isocyanate groups and hydroxyl groups is highly exothermic. Therefore, in accordance with established practice it is generally preferable to prepare a mixture of the propoxylated N-aminoethylpiperazine of the present invention with the polyol, blowing agent and foam stabilizer and then to add rapidly the polyisocyanate to the mixture with good agitation.

Because of an exothermic nature of the reaction, the heat that is liberated will cause a blowing of the foam. Suitably, the reaction rates should be of a nature such that the foam rises to a stable height within about 5 to about 150 seconds after mixing of the organic polyisocyanate with the other ingredients for the foam preparation.

Surprisingly, polyurethane foams of a rigid nature prepared by the present invention have good stability characteristics whereby post curing can be minimized.

The invention will be further illustrated by the following specific examples which are given by way of illustration and not as limitations on the scope of this invention.

EXAMPLE I

*Preparation of propoxylated N-aminoethylpiperazine*

Aminoethylpiperazine (14.5 pounds, 0.112 pound mol) was charged to a five-gallon stirred autoclave. Air was removed by flushing the kettle with nitrogen or natural gas. The amine was heated to 110° C. and propylene oxide added with stirring. During the addition of propylene oxide the temperature was maintained at 110° C., and the pressure was not allowed to exceed 60 p.s.i.g. Approximately 2½ hours were required for the addition of 19.7 pounds (0.339 pound mol) of propylene oxide. The product was stirred and heated at 110° C. for an additional hour after all of the propylene oxide had been added. The propoxylated amine was a light colored viscous liquid having the following properties:

| | |
|---|---|
| Primary amine _____meq./g__ | 0.1 |
| Secondary amine _____meq./g__ | 0.0 |
| Tertiary amine _____meq./g__ | 6.50 |
| Hydroxyl number _____ | 551 |
| Color (APHA) _____ | 50 |
| pH (1 wt. percent aqueous) _____ | 10.8 |

EXAMPLE II

*Preparation of rigid foams based upon propoxylated N-aminoethylpiperazine*

As an indication of the excellent catalytic activity of the compound of the present invention, an attempt to prepare a polyurethane foam by reactive compound of the present invention with an equivalent amount of toluene diisocyanates in accordance with the so-called "one-shot" method resulted in an unstable foam, since the foams formed by the reaction had an excessively rapid rise time of about four seconds as compared with the chain extension reaction time which was considerably slower.

EXAMPLE III

As another example of the excellent catalytic activity of the compound of the present invention, an attempt to prepare a rigid foam by the so-called "quasi prepolymer" method was unsuccessful. Thus, mixing of the propoxylated N-aminoethylpiperazine with toluene diisocyanate caused the formation of a gel.

EXAMPLE IV

A good polyurethane rigid foam was prepared by the following procedure:

Components in parts by weight used to prepare the rigid urethane foam were as follows:

| | |
|---|---|
| Propoxylated N-aminoethylpiperazine _____ | 45 |
| Oxypropylated glycerine of 400 M.W. _____ | 55 |
| Toluene diisocyanate (commercial products contain 80% 2,4-isomer and 20% 2,6-isomer, hereafter referred to as TDI) _____ | 69.5 |
| Halogenated methane _____ | 25 |
| Silicone _____ | 1.5 |

All of the components except the toluene diisocyanate were stirred at 900 r.p.m. for one minute. Toluene diisocyanate was added and the mixture was stirred for an additional ten seconds and the product poured into a mold. The rise time was 35 seconds, and the maximum internal temperature of the foam was 183° C. The product, after curing at room temperature, was a non-tacky rigid foam.

EXAMPLE V

Components in parts by weight used to prepare the rigid foam were as follows:

| | |
|---|---|
| Propoxylated N-aminoethylpiperazine _____ | 30 |
| Oxypropylated glycerine of 400 M.W. _____ | 70 |
| TDI _____ | 65 |
| Halogenated methane _____ | 25 |
| Silicone _____ | 1.5 |

Components were mixed and stirred as in Example II. The product had a rise time of 65 seconds and the maximum internal temperature of the foam was 176° C. After curing at room temperature, a non-tacky rigid foam was obtained.

Comparing Examples II and III, one notes that the formulation containing the smallest amount of propoxylated N-aminoethylpiperazine had the longest use time. This is due to the smaller amount of catalyst in the form of the tertiary amine groups in the propoxylated N-aminoethylpiperazine.

EXAMPLE VI

The preceding example was repeated except that an equal weight of the tetrapropoxy derivative of ethylenediamine was substituted for propoxylated N-aminoethylpiperazine, and except that 77.8 parts of the toluene diisocyanates were employed.

In this situation, the product had a rise time of about 90 seconds and a maximum internal temperature of the foam of about 154° C. Moreover, the foam suffered a partial collapse.

From this it is seen that the propylene oxide condensate of ethylenediamine was not as effective as the compound of the present invention for the preparation of polyurethane foams.

What is claimed is:

1. A method for preparing a rigid polyurethane foam which comprises reacting a hydroxy component with an excess of an organic polyisocyanate in the presence of 5 to 15 wt. percent of a blowing agent and 0.01 to 5 wt. percent of a foam stabilizer based on the combined weight of the hydroxy component and the polyisocyanate, said hydroxy component comprising 10 to 70 wt. percent of a polyol having a hydroxyl number in the range from about 250 to 750 and from about 90 to 30 wt. percent of 1-{2[bis(2-hydroxypropyl)amino]ethyl}-4-(2-hydroxypropyl)piperazine.

2. A method as in claim 1 wherein the polyol is a polyether polyol.

3. A method as in claim 1 wherein the polyol is a linear polyester having terminal hydroxy groups.

4. A method as in claim 1 wherein the blowing agent is a normally liquid halogenated aliphatic hydrocarbon.

References Cited by the Examiner

UNITED STATES PATENTS

| | | | |
|---|---|---|---|
| 2,995,530 | 8/1961 | Frisch | 260—2.5 |
| 3,075,927 | 1/1963 | Lanham | 260—2.5 |
| 3,112,281 | 11/1963 | Gromacki | 260—2.5 |

LEON J. BERCOVITZ, *Primary Examiner.*

DONALD E. CZAJA, *Examiner.*